United States Patent [19]

Patton

[11] E Re. 30,067

[45] Reissued Aug. 7, 1979

[54] IMINOIMIDAZOLIDINEDIONE AND PARABANIC ACID POLYMERS CONTAINING IMIDE GROUPS

[75] Inventor: Tad L. Patton, Baytown, Tex.

[73] Assignee: Exxon Research & Engineering Co., Florham Park, N.J.

[21] Appl. No.: 847,936

[22] Filed: Nov. 2, 1977

Related U.S. Patent Documents

Reissue of:

[64] Patent No.: 3,933,758
Issued: Jan. 20, 1976
Appl. No.: 409,964
Filed: Oct. 26, 1973

[51] Int. Cl.[2] ..... C08G 18/00

[52] U.S. Cl. ..... 525/419; 528/51; 528/52; 528/53; 528/57; 528/73; 528/44

[58] Field of Search ..... 528/44, 73, 46, 53, 528/57, 51, 52

[56] References Cited

U.S. PATENT DOCUMENTS

| | | | |
|---|---|---|---|
| 3,299,101 | 1/1967 | Tocker | 260/78 TF |
| 3,356,648 | 12/1967 | Rogers | 260/78 TF |
| 3,376,260 | 4/1968 | Fritz | 260/78 TF |
| 3,591,562 | 7/1971 | Patton | 260/77.5 CH |
| 3,609,113 | 9/1971 | Schade et al. | 260/77.5 CH |
| 3,635,905 | 1/1972 | Patton | 260/77.5 R |
| 3,661,859 | 5/1972 | Patton | 260/77.5 CH |
| 3,684,773 | 8/1972 | Patton | 260/77.5 CH |
| 3,705,874 | 12/1972 | Merten et al. | 260/78 TF |
| 3,887,507 | 6/1975 | Reese et al. | 260/37 N |
| 4,018,743 | 4/1977 | Kraft et al. | 260/77.5 CH |

FOREIGN PATENT DOCUMENTS

| | | | |
|---|---|---|---|
| 768572 | 12/1971 | Belgium | 260/77.5 CH |
| 7117419 | 2/1973 | Netherlands | 260/37 N |
| 1309190 | 3/1973 | United Kingdom | 260/77.5 CH |
| 1334890 | 10/1973 | United Kingdom | 260/37 N |

OTHER PUBLICATIONS

Oda et al., J. Chem Soc Japan, Ind. Chem Sect., 64, No. 4, 1961, pp. 741–742.

Oku et al., Die Makromolecular Chemie, 78, 1964, pp. 186–193.

*Primary Examiner*—Maurice J. Welsh
*Attorney, Agent, or Firm*—M. B. Kurtzman

[57] ABSTRACT

Novel iminoimidazolidinedione polymers containing imide groups (hereinafter PIPA-IM) are prepared from mixtures of dianhydrides, hydrogen cyanide and diisocyanates in an appropriate solvent and with an appropriate catalyst. The cyanide ion is an effective catalyst for all of the reactions involved. Hydrolysis of these polymers produces novel parabanic acid polymers containing imide groups (hereinafter PPA-IM).

15 Claims, No Drawings

IMINOIMIDAZOLIDINEDIONE AND PARABANIC ACID POLYMERS CONTAINING IMIDE GROUPS

Matter enclosed in heavy brackets [ ] appears in the original patent but forms no part of this reissue specification; matter printed in italics indicates the additions made by reissue.

CROSS REFERENCES TO RELATED APPLICATIONS

There are no formally related applications owned by the same assignee, but there is a copending, commonly assigned application filed on the same day which covers the use of the cyanide ion as a catalyst for preparing imides.

PRIOR ART

The preparation of PIPA such as poly (4-imino-1,3-imidazolidine-2,4, diones), which are a unique family heterocyclic polymers is disclosed in U.S. Pat. No. 3,591,562, in the name of the present inventor. The use of cyanide ions as a catalyst for these heterocyclic polymers is disclosed in U.S. Pat. No. 3,635,905, also by the same inventor.

The formation of polyimides is an old and well documented art. Very roughly, these polymers are prepared by reacting either a diamine or a diisocyanate with a carboxylic dianhydride such as pyromellitic dianhydride. Typical preparations of such polyimides are set forth in U.S. Pat. Nos. 3,299,101; 3,376,260; 3,356,648, etc.

U.S. Pat. No. 3,705,874 discloses a technique for preparing polyhydantoin polymers which also contain imide-units and does not use cyanide ion.

SUMMARY OF THE INVENTION

PIPA-IM having unusual properties are prepared from mixtures of acid dianhydrides, diisocyanates, and hydrogen cyanide, PPA-IM are prepared by hydrolysis of PIPA-IM.

DESCRIPTION OF THE INVENTION WITH PREFERRED EMBODIMENTS

It has been found and forms the substance of this invention that mixtures of acid anhydrides, particularly dianhydrides, with polyisocyanates, particularly diisocyanates, and hydrogen cyanide in an appropriate solvent, particularly aprotic dipolar-solvents, will form polymers in which the following units will be distributed throughout the polymer chain.

I

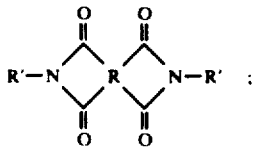

II

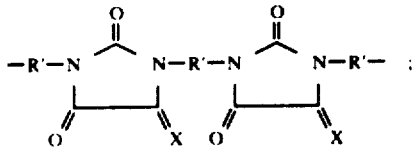

-continued

III

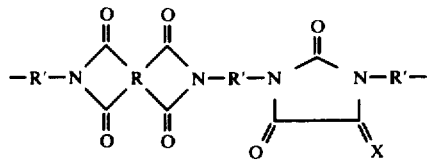

where R is the organic moiety of the carboxylic dianhydride; R' is the organic moiety of the diisocyanate; X is NH or O.

The units above can be either randomly distributed throughout the polymer chain, or can be in appropriate blocks.

With suitable modification of procedure a great number of polymers can be prepared in a variety of ways and with a variety of distributions of the parabanic acid and the iminoimidazolidinedione units and the imide units.

Thus, for example, one may have random distribution of the imide groups.

One may have blocks of polyiminoimidazolidinedione or polyparabanic acid units, and blocks of polyimides.

When preparing blocks, one can first prepare polyimide precursors from a mixture of a diisocyanate and a dianhydride and then introduce HCN into the reaction solution of the isocyanate-terminated polyimides and diisocyanates. Any suitable catalyst for these reactions can be used, although cyanide ion is preferred.

Alternatively, one can first form an isocyanate-terminated polyiminoimidazolidinedione prepolymer and then subsequently add a tetracarboxylic acid dianhydride to a solution of prepolymer and excess diisocyanate. Cyanide ion is a preferred initiator to the reaction and to subsequently form polyiminoimidazolidinedione imides. Alternatively, other imide forming catalysts can be used in the second step.

Monoanhydrides and monoisocyanates can be added at an appropriate point as chain terminators to control the molecular weight of the polyiminoimidazolidinedione imide polymers. The same technique can be used to chain terminate conventionally prepared polyiminoimidazolidinedione and polyimide polymers. Unique type polymers terminated with a maleimide can also be obtained by using maleic anhydride as a chain terminator. These terminally unsaturated compounds have great utility as cross-linking agents, as co-curatives in elastomers, and as the major component in a thermosettable composition.

A wide variety of copolymers containing from 99 to 1, optionally 80 to 30, and alternatively, 40 to 60 mol percent iminoimidazolidinedione or derivatives thereof units and 1 to 99, optionally 30 to 80, and alternatively 60 to 40 mol percent imide units may be made.

It is preferred that the catalyst be cyanide ion. But other suitable catalysts such as tertiary amines may be used to form the poly(iminoimidazolidinedioneimides). When tertiary amines are used, cross-linking may occur. Therefore, the proper selection of the catalyst and reaction conditions may determine whether cross-linked or linear polymers are formed. See U.S. Pat. No. 3,591,562 for a description of catalysts.

The cyanide ion is generally obtained from a solution of a cyanide salt and is preferably an alkali metal cyanide. Typical salts from which the cyanide ion may be obtained include NaCN, KCN, $Cd(CN)_2$, and $Zn(CN)_2$.

The particular salt or other compound from which the cyanide ion is derived is not critical. It is preferred that the cyanide salt that is utilized be soluble in the solvent to be used in the particular system. Many of the reactions in which PIPA-IM is formed will take place in dipolar aprotic solvents, especially when those reactions are designed to result in soluble polymers. The sodium cyanide is very soluble in hexamethylphosphormamide, dimethylsulfoxide, dimethylformamide, dimethylacetamide, N-methylpyrolidone. Potassium cyanide is especially soluble in dimethylsulfoxide and hexamethylphosphormamide.

In the event that solvents are to be used in which the particular cyanide salt is not particularly soluble, the problem can be ameliorated by dissolving the cyanide in a solvent in which it is particularly soluble and which is soluble in the reaction solvent. Then this particular concentrate of cyanide ion is mixed in with the reactant solution.

The cyanide ion is present in catalytic amounts sufficient to accomplish its purpose. An excess of catalytic agent can always be present, but it is clear that utilizing an excess of catalyst beyond that quantity necessary to promote the reaction as desired, is simply a waste of catalyst, and could be quite uneconomical, as well as presenting a problem of separating the catalyst salt from the resulting products.

Very generally, a suitable concentration of cyanide ion to use in the reaction would be about $10^{-4}$ to $10^{-1}$, preferably $10^{-3}$ to $10^{-2}$, moles per liter.

For preparing polymers according to the invention one must have HCN and both polyisocyanates and polyanhydrides as reaction components. The polyisocyanate is preferably a diisocyanate and the polyanhydride is preferably a dianhydride, particularly an aromatic dianhydride, but multi-functional versions of both anhydrides and isocyanates can be used to additionally modify the properties.

Anhydrides corresponding to the following formula are suitable:

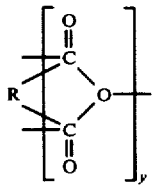

in which formula R represents a 2y-valent aliphatic, aliphatic-aromatic, or aromatic radical and y represents an integer from 2 to 3, preferably, 2. When y=1, the anhydride can be used as the chain terminator discussed above.

Anhydrides useable in the invention are derived, for example from pyromellitic acid; trimellitic acid; naphthalene-1,4,5,8-, naphthalene-2,3,6,7- or naphthalene-1,2,5,6-tetracarboxylic acid; from diphenyl ether-3,3',4,4', or diphenyl-3,3',4,4'- or diphenyl ether-2,2',3,3'- or diphenyl-2,2',3,3'-tetracarboxylic acid; from 2,2-bis-(3,4-dicarboxyphenyl)-propane; from bis-(3,4-dicarboxyphenyl)-sulphone; from perylene-3,4,9,10-tetracarboxylic acid or from ethylene tetracarboxylic acid.

The internal anhydrides of hydroxy-, mercapto- or amino-substituted o-phthalic acids; and of hydroxy-, mercapto- or amino-substituted naphthalene dicarboxylic acids whose carboxyl groups are in the o-position to one another, can also be used. Bis-adducts of maleic acid or maleic acid anhydride with styrene or substituted styrenes are also suitable for the purposes of the process according to the invention, as are phenylene-bis-alkane-di-(carboxylic acid anhydrides), of the kind described in Belgian patent specification No. 613,374, bicyclo-tetracarboxylic acid dianhydrides of the kind described in U.S. patent specification No. 3,037,966, and polyanhydrides obtained by chlorinating paraffins in the presence of, for example, maleic acid anhydride.

The compounds used as anhydride components may also be of a more or less polymeric nature, for example bis-trimellitic anhydride esters of the structural formula

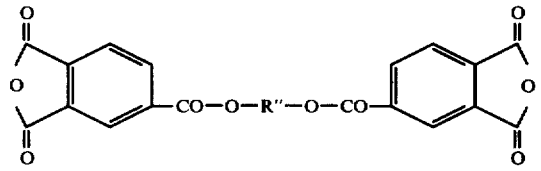

may also be used here. In this structural formula, R'' represents a saturated or an unsaturated, aliphatic or cycloaliphatic bivalent radical in which aromatic, cycloaliphatic or heterocyclic ring systems and ether-, ester-, sulphide-, sulphoxide- or sulphone bridges may be incorporated, and which may optionally be substituted by chlorine, bromine or iodine atoms or by a nitro-, alkoxy- or mercapto group.

The following are examples of R'':

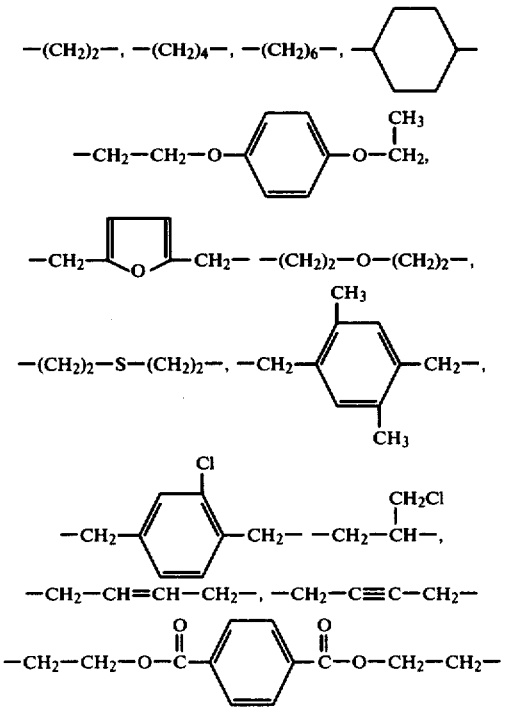

The isocyanates which can be used in the reaction are characterized by the formula $R'(NCO)_x$ in which R' is a $C^4$ to $C^{60}$ hydrocarbon or substituted hydrocarbon constituent, i.e. aliphatic, alicyclic, aromatic, or combinations and mixtures thereof in which the functionally substituted derivatives thereof will not react with isocyanate groups. Preferably X is 2, but can be 3 to 5. When used as a chain terminator X is 1. NCO can also be substituted by NCS.

The monoisocyanates, diisocyanates or polyiscyanates used in the invention are selected from a broad group having a large variety of organic moieties. The organic moieties of these isocyanates can be substituted with groups such as alkyl, aryl, halogens, sulfoxy, sulfonyl, alkoxy, aryloxy, oxo, ester, alkylthio, arylthio, nitro and the like which do not react with the isocyanate or anhydride group. Functional groups which have active hydrogen atoms (e.g. carboxylic acids, hydroxyl groups, amines, etc.) should not be present.

Each isocyanate may be characterized by its specific organic moiety. For example, those diisocyanates having an aliphatic hydrocarbon moiety are exemplified by tetramethylene diisocyanate; hexamethylene diisocyanate; dodecamethylene diisocyanate; 2,2,4-trimethylhexamethylene diisocyanate; and the like. Diisocyanates characterized by having aromatic hydrocarbon moieties are exemplified by m-phenylene diisocyanate; p-phenylene diisocyanate; biphenylene diisocyanate; 1,5-naphthalene diisocyanate; and the like. A diisocyanate having an alicyclic hydrocarbon moiety is 1,4-diisocyanato cyclohexane and 3-isocyanato-methyl-3,5,5-trimethylcyclohexyl isocyanate.

The diisocyanates containing more than one type of hydrocarbon moiety are exemplified by toluene diisocyanate; durene diisocyanate; 4,4'-diphenylmethane diisocyanate; 3,3'-dimethyl-4,4'-diphenylene diisocyanate; 4,4'-diphenylisopropylidene; p-xylylene diisocyanate; m-xylylene diisocyanate; 4,4'-methylene bis(cyclohexyl isocyanate); 4-(4-isocyanatocyclohexyl) phenylisocyanate; 4-isocyanatobenzyl isocyanate; and the like.

It is noted that in the foregoing examples the isocyanate groups in each of the diisocyanates may be attached to the same or different hydrocarbon portions of the organic moiety.

Further, diisocyanates which have organic moieties containing functional groups may also be used and are exemplified by 4,4'-diphenylsulfone diisocyanate; 4,4'-diphenylether diisocyanate; 3,3'-dimethoxy-4,4'-diphenylene diisocyanate; di(3-isocyanato-propyl)ether; tetrafluoro-p-phenylene diisocyanate; tetrafluoro-m-phenylene diisocyanate; 4,4'-diisocyanate-octafluorobiphenyl and the like. Mixtures of the diisocyanates may be used.

Diisocyanate, as used herein, is a general class of compounds meant to include those compounds which have polymeric organic moieties such as the prepolymer diisocyanates which are used in the field of urethane polymers. Further, specific diisocyanates which may be used in the present invention are found in patents, articles, or organic textbooks; a specific example being the paper "Mono and Polyisocyanates" by W. Sieflken, Annalen der Chemie, 562, 6–136 (1949), which is incorporated herein by reference.

Examples of suitable monoisocyanates are phenylisocyanates, or substituted phenyl isocyanates such as chloro, bromo, nitro, alkoxy carboxyl N-butyl isocyanate, octyl isocyanate, phenyl isocyanates. In general, aromatic isocyanates are more reactive than aliphatic isocyanates and therefore are usually preferred.

Any suitable solvent can be used in the reaction of the invention. Indeed mixtures of solvents can be utilized in which the resulting solution is such that the reactants themselves are soluble but the resulting products are insoluble. Thus the product precipitates out as it forms and is easy to separate from the solvent and starting materials.

Very generally, the preferred solvents are dipolar aprotic solvents.

These are defined as molecules with a substantial dipole moment arising from a charge separation within a group of two or three atoms. Aprotic molecules do not have a hydrogen capable of ionization or hydrogen bonding. Dipolar aprotic solvents solvate cations strongly. The negative end of the solvent dipole is the one which is strongly associated with the cations from the cyanide salt.

Therefore, anions such as cyanide ion are liberated from the influence of the cation and are therefore readily available to interact with polar groups such as NCO and anhydride groups. The decreased solvation of these anions in such solvents enhances their reactivity in ionic or ionically catalyzed reactions.

Generally speaking, typical aprotic dipolar solvents useful in this reaction are:

Dimethylsulfoxide
Tetrahydrothiophene dioxide (sulfolane)
Pyridine-1-oxide
Nitrobenzene
Acetonitrile
Benzonitrile
Dimethylformamide
Dimethylacetamide
1-Methyl-2-pyrrolidone
Acetone
Trimethylphosphine oxide
Hexamethylphosphoramide The resulting plastics (or, in some instances, elastomers, if the particular hydrocarbon backbone is flexible enough) can be molded, cast in film, used as varnishes, and in general would be subject to a wide variety of uses.

They would be particularly suitable for stoving lacquers, in particular for wire lacquers (electrical insulating lacquers).

The plastics obtained in accordance with the invention are highly temperature resistant materials and can be used as the base for flexible circuit films.

Moreover, fibers can be produced from these plastics and laminates can be made from them by a pressure application to various cloths.

Solution casting can be utilized to make films and coatings. Powder can be caused to coalesce into continuous films by heat alone or by utilizing heat with solvents. The latter technique is described in detail in another patent application by the same inventor.

Very high quality fibers can be made from the polymers of the invention, particularly as the paraphenylene content of the aromatic portion of the molecule increases. Thus the likelihood of obtaining copolymers which are ordered and thus can be oriented to increase crystallinity can be improved by the presence of the polyimide groups.

In any event the polyimide portion should contain a preponderance of paraphenylene groupings since these directionally tend to develop order. And order leads to improved tensile strength and long term heat aging at elevated temperatures.

The resulting high modulus fibers from the new polymers of the invention will be particularly useful for reinforcement of tires in the belt carcass and for composites which weight savings are extremely important, i.e., aircraft applications.

The invention is further illustrated by the following examples:

EXAMPLE 1

Working Example

A solution of 0.062 g. of sodium cyanide in 7.8 ml. DMF (dimethylformamide) was added under anhydrous conditions to a solution of 156.7 g. of diphenylmethane diisocyanate and 20.3 g. of hydrogen cyanide in 1135 ml. of DMF.

The temperature increased from 27° C. to 59° C., and after 6 minutes a solution of 40 g. of benzophenone tetracarboxylic dianhydride was added to the stirred solution. Then after stirring an additional two minutes 0.124 g. of sodium cyanide in 15.5 ml. DMF was added.

During the next 90 minutes the reaction temperature decreased to 34° C. It was heated slowly to 113° C.; vigorous evolution of carbon dioxide began at about 90° C.

After heating 1 hour the solution of PIPA-IM was cooled to 60° C. and an acid solution composed of 18 g. of 96 percent sulfuric acid, 54 g. of water, and 72 ml. DMF was added.

After stirring 30 minutes the viscous solution was centrifuged to remove the amonium sulfate which formed during hydrolysis.

Part of the clear filtrate was cast into a clear yellow flexible film.

The rest of the clear filtrate was precipitated in water. The product was filtered, washed with water, and dried. The PPA-IM polymer had an inherent viscosity of 0.94 (0.5 g. polymer in 100 ml. DMF at 25° C.)

EXAMPLE 2

Paper Example

To a clear solution of 16.6 g. of benzophenone tetracarboxylic dianhydride and 25.0 g. of diphenylmethane diisocyanate in 200 ml. DMF is added 0.25 g. of sodium cyanide in 30 ml. DMF under anhydrous conditions. The temperature is increased to 75° C. and kept there for 20 minutes. Then it is cooled to 30° C., and 1.4 g. of hydrogen cyanide is added. The temperature increases to 42° C.

After 30 minutes the viscous PIPA-IM polymer solution is stirred with a solution of 5 g. of 96 percent sulfuric acid, 18 g. water, and 24 ml. DMF for an additional 30 minutes.

The parabanic acid-imide copolymer is precipitated in water, washed with water, and dried.

What is claimed is:

1. As a composition of matter a new class of polymers [which are] *selected from the group of* iminoimidazolidinedione polymers containing imide groups [or their hydrolysis derivatives, which are parabanic] *and iminoimidazolidinedione-parabanic* acid polymers containing imide groups.

2. The polymers of claim 1 which have at least one polyimide moiety and at least one polyparabanic acid moiety.

3. The polymers of claim 1 which have at least one polyimide moiety and at least one iminoimidazolidinedione moiety.

4. A polymer according to claim 1 which has at least one each of the units set forth below:

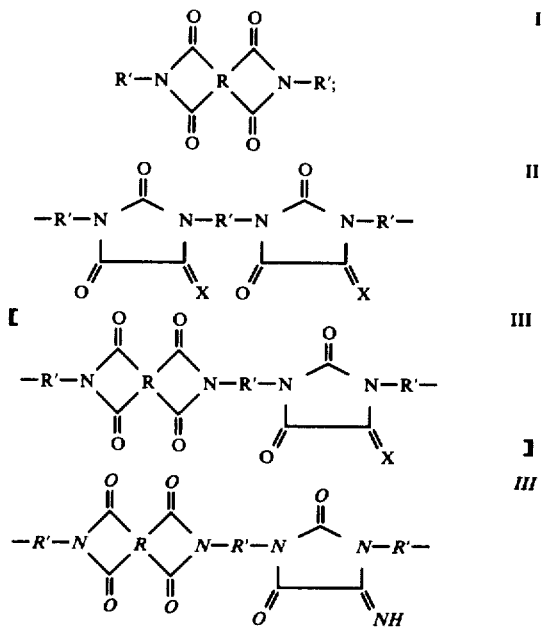

wherein X = NH or O *R is an organic moiety of a carboxylic dianhydride and R' is an organic moiety of a diisocyanate.*

5. A polymer according to claim 4 which contains at least two units as set forth below:

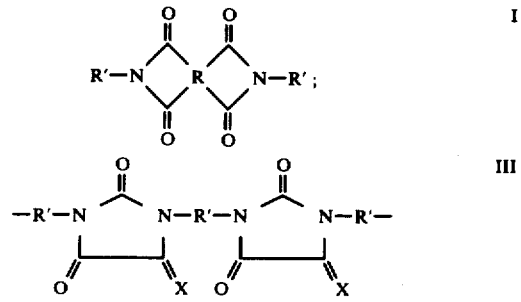

wherein X = NH or O *R is an organic moiety of a carboxylic dianhydride and R' is an organic moiety of a diisocyanate.*

6. The polymer of claim 1 wherein said [dianhydride is] *imide groups are* derived from pyromelletic anhydride and the [isocyanate derived] *iminoimidazolidinedione and parabanic acid* portion is *derived* from a diphenylether diisocyanate.

7. A method of preparing iminoimidazolidinedione polymers containing imide groups which comprises reacting in an appropriate solvent, a selected molar portion of dianhydrides, diisocyanates, and hydrogen cyanide in the presence of a catalyst.

8. The method of preparing polymers containing imide groups and parabanic acid groups by hydrolyzing iminodazolidinedione polymers containing imide groups prepared by the process of claim 7.

9. A method according to claim 7 in which the anhydride has the following formula:

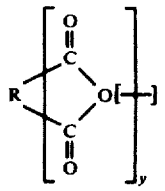

in which formula R represents a 2y-valent aliphatic, aliphatic-aromatic, or aromatic radical and y represents an integer from 2 to 3 and which the isocyanate has the following formula:

$R'(NCO)_x$ is which R' is a $C_4$ to $C_{60}$ hydrocarbon or substituted hydrocarbon constituent, selected from the group consisting of aliphatic, alicyclic, aromatic constituents, or combinations and mixtures thereof in which the functionally substituted derivatives thereof will not react with isocyanate groups and X is 2 to 5.

10. A method according to claim 7 wherein said reaction takes place in the presence of a catalyst which is a cyanide ion.

11. A process according to the above claim 10 in which said cyanide ion is derived from sodium cyanide.

12. A process according to claim 7 above wherein the solvent utilized to carry out said reaction is an aprotic dipolar solvent.

13. A process according to claim 9 in which the isocyanate (NCO) group is substituted by NCS.

14. The process according to claim 7 in which a monoanhydride having a $C_4$ to $C_{60}$ hydrocarbon or substitute hydrocarbon constituent selected from aliphatic, alicyclic, aromatic constituents, or combinations and mixtures thereof, in which the functionally substituted derivatives thereof will not react with isocyanate groups is used as a chain terminating agent.

*15. The polymer of claim 1 wherein said imide groups are derived from benzophenone tetracarboxylic dianhydride and the iminoimidazolidinedione and parabanic acid portion is derived from a diphenyl methane diisocyanate.*

* * * * *